United States Patent
Ryu et al.

(10) Patent No.: US 7,236,468 B2
(45) Date of Patent: Jun. 26, 2007

(54) APPARATUS AND METHOD FOR GENERATING REFERENCE TIMING IN A CDMA MOBILE COMMUNICATION SYSTEM

(75) Inventors: Dong-Ryeol Ryu, Seoul (KR);
Joo-Kwang Kim, Yongin-shi (KR);
Kwang-Man Ok, Songnam-shi (KR);
Chae-Man Lim, Seoul (KR);
Seong-Ho Hur, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 941 days.

(21) Appl. No.: 10/266,679

(22) Filed: Oct. 8, 2002

(65) Prior Publication Data

US 2003/0169702 A1    Sep. 11, 2003

(30) Foreign Application Priority Data

Oct. 8, 2001    (KR) ............... 10-2001-0061789

(51) Int. Cl.
*H04B 7/216*    (2006.01)

(52) U.S. Cl. ............... 370/320; 370/503; 370/491; 445/334

(58) Field of Classification Search ......... 370/320, 370/304, 298, 324, 326, 342, 147, 149, 350, 370/335, 345, 441, 431, 464, 503, 912; 445/334
See application file for complete search history.

(56) References Cited

U.S. PATENT DOCUMENTS

| | | | |
|---|---|---|---|
| 6,744,747 B2* | 6/2004 | Shiu et al. ........... | 370/331 |
| 6,768,768 B2* | 7/2004 | Rao et al. ........... | 375/142 |
| 6,894,995 B2* | 5/2005 | Chitrapu et al. ....... | 370/335 |
| 2002/0027898 A1* | 3/2002 | Tanno et al. .......... | 370/350 |
| 2002/0034944 A1* | 3/2002 | Tanno et al. .......... | 455/434 |

* cited by examiner

*Primary Examiner*—Dang T. Ton
*Assistant Examiner*—Hicham B Foud
(74) *Attorney, Agent, or Firm*—The Farrell Law Firm

(57) ABSTRACT

A cell search apparatus and method in a W-CDMA mobile communication system. The cell search apparatus and method performs a first cell search step, a second cell search step, and a third cell search step using a slot count value and a lower count value, counted by an index counter after being initialized upon power up of a UE (User Equipment), thereby determining a scrambling code for a Node B. Further, the cell search apparatus and method manages neighboring Node Bs by performing a multipath search.

22 Claims, 11 Drawing Sheets

APPARATUS AND METHOD FOR GENERATING REFERENCE TIMING IN A CDMA MOBILE COMMUNICATION SYSTEM

PRIORITY

This application claims priority to an application entitled "Apparatus and Method for Generating Reference Timing in a CDMA Mobile Communication System" filed in the Korean Industrial Property Office on Oct. 8, 2001 and assigned Serial No. 2001-61789, the contents of which are hereby incorporated by reference.

BACKGROUND OF THE INVENTION

1. Field of the Invention

The present invention relates generally to an apparatus and method for a cell search and demodulation in an asynchronous mobile communication system, and in particular, to an apparatus and method for generating reference timing for a cell search and demodulation.

2. Description of the Related Art

In general, a mobile communication system can be classified into a synchronous system that is used in the United States and an asynchronous system that is used in Europe for $3^{rd}$ generation mobile communication.

With the rapid development of the mobile communication industry, a future mobile communication system, which provides not only the general voice service but also data and image services, has been developed, and standardization works thereon are being carried out. However, as stated above, the United States and Europe use different standardizations for mobile communication systems. A European future mobile communication system is called a 3GPP W-CDMA ($3^{rd}$ Generation Partnership Project Wideband Code Division Multiple Access) mobile communication system. In the W-CDMA mobile communication system, Node Bs are not synchronized with one another. Thus, in order to identify the Node Bs, unique scrambling codes are assigned to the Node Bs. For example, if the number of cells, or Node Bs constituting the W-CDMA mobile communication system is 512, each of the 512 Node Bs is assigned its own unique scrambling code among 512 scrambling codes.

Meanwhile, in the W-CDMA mobile communication system, a UE (User Equipment) must recognize a scrambling code assigned to a serving Node B from which the UE desires to receive a service. Therefore, the UE must perform an operation of determining a scrambling code of a signal received at a highest power among the signals received from neighboring Node Bs. This operation is generally called a "cell search."

In the W-CDMA mobile communication system which assigns scrambling codes as stated above, a UE uses a general cell search algorithm for examining phases of all the assignable scrambling codes, for a cell search. However, such a general cell search algorithm is inefficient, since it requires a long cell search time.

To solve this problem, a multistep cell search algorithm has been proposed. In order to realize the multistep cell search algorithm, 512 scrambling codes are divided into 64 code groups, and each of the 64 code groups is assigned 8 scrambling codes. Further, in order to easily perform the cell search, a synchronization channel (SCH) signal and a common pilot channel (CPICH) signal are used. The synchronization channel includes a primary synchronization channel (P-SCH) signal and a secondary synchronization channel (S-SCH) signal. The SCH signal and the CPICH signal are provided from a Node B to a UE over a downlink.

The multistep cell search algorithm includes first to third cell, search steps. In the first cell search step, a UE synchronizes a slot time of a slot received at maximum power, using a P-SCH transmitted from a Node B. In the second cell search step, the UE performs frame synchronization and detects a Node B group designation code for a Node B to which the UE belongs, through an S-SCH transmitted from the Node B in the slot time synchronized state. In the third cell search step, the UE finally searches a Node B where the UE itself belongs by detecting a scrambling code of a Node B, using a CPICH transmitted from the Node B, based on the frame synchronization and the Node B group designation code searched in the second cell search step.

FIG. 1 illustrates a structure of an SCH and a CPICH used for cell search in a general W-CDMA mobile communication system. Referring to FIG. 1, one frame is comprised of 15 slots. A P-SCH and an S-SCH are transmitted by N=256 chips at the beginning of each slot, and the two channel signals are overlapped since orthogonality is maintained between the channel signals. For the CPICH signal, each Node B uses its own unique scrambling code, and a period of the scrambling code is equal to a length of one frame. In a W-CDMA mobile communication system having this channel structure, only one-frame length of a Gold code with a period $2^{18}$-1 is used as the scrambling code, and only M=512 Gold codes among the available Gold codes are used.

A primary synchronization code $c_p$ used for the P-SCH is commonly used for all cells (or Node Bs), and only a 256-chip period, 1/10 of one-slot period, is repeatedly transmitted at the beginning of each slot. The P-SCH is used by a UE to search slot timing of a received signal. That is, the UE receives the P-SCH and synchronizes a Node B slot time by a primary synchronization code $c_p$ included in the received P-SCH (First Cell Search Step).

The S-SCH is mapped with secondary synchronization codes for Node Bs, i.e., Node B group designation codes $c_s^{i,1} \sim c_s^{i,15}$ during transmission, and a Node B time-slot-synchronized by the P-SCH detects a Node B group designation code and frame synchronization through the S-SCH. Here, the Node B group designation code is information for determining a cell group where a Node B belongs, and a comma free code is typically used for the Node B group designation code. The comma free code is comprised of 64 codewords, each codeword is comprised of 15 symbols, and the 15 symbols are repeatedly transmitted each frame. However, the 15 symbols are mapped to one of the secondary synchronization codes $c_s^{i,1} \sim c_s^{i,15}$ during transmission, as stated above. That is, as illustrated in FIG. 1, an $i^{th}$ secondary synchronization code corresponding to a symbol value i is transmitted each slot. The 64 codewords of the comma free code distinguish 64 code groups. The comma free code is characterized in that each codeword has a unique cyclic shift. Therefore, it is possible to acquire information on a code group and frame synchronization by correlating the secondary synchronization codes with the secondary synchronization channel signal for several slot periods and then checking 64 codewords and 15 cyclic shifts of each codeword. Here, the term "frame synchronization" means synchronization for timing or phase within one period of a scrambling or spreading code in a spread spectrum communication system. In the latest W-CDMA mobile communication system, since one period of the spreading code and a length of the frame are both 10 ms, this will be called frame synchronization (Second Cell Search Step).

By performing the second and third cell search steps, the UE acquires information on slot synchronization, Node B group designation code, and frame synchronization through the P-SCH and the S-SCH. However, the UE does not recognize yet a scrambling code for a Node B where the UE itself belongs, among 8 scrambling codes within a code group based on the acquired Node B group designation code, so code synchronization has not been completed yet.

Therefore, the UE can identify a scrambling code to use among the 8 scrambling codes by taking correlation between the 8 scrambling codes belonging to the code group for the CPICH (Third Cell Search Step).

Meanwhile, the UE must periodically check power levels of signals from the serving Node B and its neighboring Node Bs in order to receive an optimal Node B multipath signal in a radio channel environment or a handoff state. In this case, the UE acquires timing information of the neighboring Node Bs either by the multistep cell search algorithm or from the Node B, and then periodically takes correlation on the CPICH from a corresponding Node B. In the following description, unlike the cell search performed when timing of neighboring Node Bs is not acquired, the process of periodically checking power levels of signals from the serving Node B and its neighboring Node Bs will be called a "multipath search."

Generally, a Node B distinguishes signals from the Node Bs that will probably move, by cell search, and continuously manages the distinguished Node B signals through the multipath search. If received signals are determined as valid multipath signals by the cell search and the multipath search, the UE demodulates the corresponding multipath signals.

As stated above, the W-CDMA mobile communication system acquires code synchronization while continuously performing the 3-step cell search. That is, in the first step, synchronization on time slot is acquired using the P-SCH, and in the second step, frame synchronization and a scrambling code group are acquired using the S-SCH. Finally, in the third step, the UE searches the CPICH after frame synchronization, and finds out a scrambling code assigned to a corresponding Node B among the 8 available scrambling codes within the code group.

In order to perform such a cell search process, it is necessary to determine a reference time when the first step will be started, and a time when the second step will be started after slot synchronization is acquired in the first step. In addition, for code group discrimination and frame synchronization acquisition in the second step, it is necessary to recognize the start point in order to determine a frame boundary from the number of cyclic shifts performed during codeword decoding. Finally, it is necessary to determine a time when the third step will be started.

Meanwhile, since the cell search process must be performed not once but continuously, the UE needs a certain criterion in order to calculate and manage a timing difference between a frame boundary of a currently modulated signal and a frame boundary of signals, to be probably demodulated, from the same Node B or different Node Bs. That is, the UE should be able to calculate a difference (offset) between a frame boundary of a neighboring Node B, detected by the cell search, and a frame boundary of another Node B, detected by the previous cell search.

In addition, the multipath search detects power levels of received signals by performing a correlation process on scrambling codes for the Node Bs that will probably move. However, since frame boundaries of the Node Bs are different from one another, the scrambling codes must be initialized before the correlation, such that the frame boundaries are aligned with a code phase of each Node B. Therefore, it is necessary to define reference timing for initializing scrambling codes for the Node Bs.

A multipath signal component determined as a valid signal by the cell search and the multipath search is assigned to a demodulator (or finger) in the UE, for demodulation. Therefore, in the demodulator of the UE, a scrambling code for the corresponding Node B must be initialized in alignment with a frame boundary of the corresponding multipath signal, and reference timing indicating this time point must be defined.

SUMMARY OF THE INVENTION

It is, therefore, an object of the present invention to provide an apparatus and method for providing reference timing for managing a code phase of a Node B in a W-CDMA mobile communication system.

It is another object of the present invention to provide an apparatus and method for determining an operating point for a multistep cell search in a W-CDMA mobile communication system.

It is further another object of the present invention to provide an apparatus and method for determining a certain criterion for a multipath search in a W-CDMA mobile communication system.

It is yet another object of the present invention to provide an apparatus and method for determining a specific criterion for calculating and managing a timing offset between a frame boundary of a signal currently modulated by a UE and a frame boundary of signals, likely to be demodulated, from the same Node B or different Node Bs in a W-CDMA mobile communication system.

It is still another object of the present invention to provide an apparatus and method for determining a time point where a UE will initialize scrambling codes for the multipath signals to be demodulated, in a W-CDMA mobile communication system.

It is still another object of the present invention to provide an apparatus and method for initializing a scrambling code of a multipath searcher so that a code phase of each Node B for a multipath search is aligned, in a W-CDMA mobile communication system.

It is still another object of the present invention to provide an apparatus and method for initializing a scrambling code such that frame boundaries of Node Bs for a multipath search should be aligned with a code phase of each Node B before correlation, in a W-CDMA mobile communication system.

In accordance with a first aspect of the present invention, there is provided a method for performing a cell search by receiving from a Node B a primary synchronization channel signal transmitted with as many chips as a predetermined chip length at the beginning of each slot, a secondary synchronization channel signal overlapping with the primary synchronization channel signal, being transmitted while maintaining orthogonality with the primary synchronization channel signal, and a common pilot channel signal scrambled by a unique scrambling code, a one-frame length of the common pilot channel signal being equal to a period of the scrambling code, each frame being comprised of a predetermined number M of slots each having a predetermined chip length N, in a UE (User Equipment) for a W-CDMA (Wideband Code Division Multiple Access) mobile communication system. The method comprises counting an index count value within a range of a one-frame length by a period shorter than or equal to the chip length, after being initialized at a predetermined time point; starting a first cell search step using the primary synchronization channel signal at a given time point, and storing the index count value at a time point where slot synchronization is acquired, as a slot timing index; starting a second cell search step using the secondary synchronization channel signal at a time point where the slot timing index matches the index count value, and storing the index count value at a time point where frame synchronization and a codeword group are acquired, as a frame timing index; and performing a third cell search step using the common pilot channel signal at a given time point, and detecting a scrambling code used by the Node B among scrambling codes constituting the codeword group.

In accordance with a second aspect of the present invention, there is provided an apparatus for performing a cell search by receiving from a Node B a primary synchronization channel signal transmitted with as many chips as a predetermined chip length at the beginning of each slot, a secondary synchronization channel signal overlapping with the primary synchronization channel signal, being transmitted while maintaining orthogonality with the primary synchronization channel signal, and a common pilot channel signal scrambled by a unique scrambling code, a one-frame length of the common pilot channel being equal to a period of the scrambling code, each frame being comprised of a predetermined number M of slots each having a predetermined chip length N, in a UE (User Equipment) for a W-CDMA (Wideband Code Division Multiple Access) mobile communication system. The apparatus comprises a controller for generating an initialization command and a search command for each of first to third cell search steps; an index counter for counting an index count value within a range of a one-frame length by a period equal to or shorter than the predetermined chip length after being initialized at a predetermined time point; a first searcher for starting the first cell search step using the primary synchronization channel signal at a given time point in response to the initialization command and the search command from the controller, and storing the index count value at a time point where slot synchronization is acquired, as a slot timing index; a second searcher for starting the second cell search step using the secondary synchronization channel signal at a time point where the slot timing index is coincident with the index count value, in response to the initialization command and the search command from the controller, and storing the index count value at a time point where the frame synchronization and a codeword code are acquired, as a frame timing index; and a third searcher for performing the third cell search step using the common pilot channel signal at a given time point in response to the initialization command and the search command from the controller, and detecting a scrambling code used by the Node B among scrambling codes constituting a codeword group.

In accordance with a third aspect of the present invention, there is provided a method for performing a cell search by receiving from a Node B a primary synchronization channel signal transmitted with as many chips as a predetermined chip length N at the beginning of each slot, a secondary synchronization channel signal overlapping with the primary synchronization channel signal, being transmitted while maintaining orthogonality with the primary synchronization channel signal, and a common pilot channel signal scrambled by a unique scrambling code, a one-frame length of the common pilot channel signal being equal to a period of the scrambling code, each frame being comprised of a predetermined number M of slots each having a predetermined chip length N, in a UE (User Equipment) for a W-CDMA (Wideband Code Division Multiple Access) mobile communication system. The method comprises the steps of: after being initialized upon power up of the UE, counting a slot count value within a one-frame length range between 0 and M−1 at periods of a slot, and counting a lower count value within a one-slot length range between 0 and K×N−1 at periods of a multiple K×N of the chip length N, wherein K is an integer; acquiring cell synchronization by performing a first cell search step by using the primary synchronization channel signal, and defining the lower count value at a time point where the cell synchronization is acquired, as a slot timing index; acquiring a code group and frame synchronization by performing a second cell search step by using the secondary synchronization channel signal at a time point where the slot timing index matches the lower count value, and defining the slot count value and the lower count value at a time point where the code group and the frame synchronization are acquired, as a frame timing index; and performing a third cell search step by using the common pilot channel signal at a time point where the frame timing index matches the slot count value and the lower count value, and after the third cell search step, detecting a scrambling code used by the Node B based on the search result.

In accordance with a fourth aspect of the present invention, there is provided an apparatus for performing a cell search by receiving from a Node B a primary synchronization channel signal transmitted with as many chips as a predetermined chip length N at the beginning of each slot, a secondary synchronization channel signal overlapping with the primary synchronization channel signal, being transmitted while maintaining orthogonality with the primary synchronization channel signal, and a common pilot channel signal scrambled by a unique scrambling code, a one-frame length of the common pilot channel signal being equal to a period of the scrambling code, each frame being comprised of a predetermined number M of slots each having a predetermined chip length N, in a UE (User Equipment) for a W-CDMA (Wideband Code Division Multiple Access) mobile communication system. The apparatus comprises: a controller for generating an initialization command and a search command for each of first to third cell search steps, and detecting a scrambling code used by the Node B based on the cell search result; a slot counter, initialized upon power up of the UE, for counting a slot count value within a one-frame length range between 0 and M−1 at periods of a slot; a lower count value, initialized upon power up of the UE, for counting a lower count value within a one-slot length range between 0 and K×N−1 at periods of a multiple K×N of the chip length N wherein K is an integer; a first-step operation signal generator for generating a first-step search operation signal at a given time point in response to the search command from the controller; a first-step searcher, initialized in response to the initialization command from the controller, for acquiring slot synchronization by performing the first cell search step using the primary synchronization channel signal in response to the first-step search operation signal from the first-step operation signal generator, reporting the search result to the controller, and storing the index count value at a time point where slot synchronization is acquired, as a slot timing index; a second-step operation signal generator for generating a second-step search operation signal at a time point where the slot timing index matches the lower count value, in response to the search command from the controller; a second-step searcher, initialized in response to the initialization command from the controller, for acquiring frame synchronization and a codeword group by performing the second cell search step using the secondary synchronization channel in response to the second-step search operation signal from the second-step operation signal generator, reporting the search result to the controller, and storing the slot count value and the lower count value at a time point where the frame synchronization and the codeword group are acquired, as a frame timing index a third-step operation signal generator for generating a third-step search operation signal at a given time point where the frame timing index matches the slot count value and the lower count value, in response to the search command from the controller; a third-step searcher, initialized in response to the initialization command from the controller, for performing the third cell search step using the common pilot channel in response to the third-step search operation signal from the third-step operation signal generator, detecting a scrambling code used by the Node B among scrambling codes constituting the codeword group, and reporting the search result to the controller; and a memory for storing a lower count value from the lower counter at a time point where a save command is received from the first-step searcher, as the slot timing index, and storing a slot count value from the slot counter and a lower count value from the lower counter at a time point where a save command is received from the second-step searcher, as the frame timing index.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In a W-CDMA mobile communication system according to the present invention, a counter operating at periods of frame (10 ms) is used in order to continuously calculate a relative timing offset (or offset between frame boundaries) between Node Bs. As an output of the counter is used as a reference time for a cell searcher, a multipath searcher, and a multipath demodulator, the counter will be referred to as an "index counter."

Upon power up of a UE, the index counter continuously operates after being initialized by a controller. If a resolution of a searcher is $1/k$ chips, the index counter should also have a resolution of at least $1/k$ chips. In the 3GPP standard specification, a length of one frame is $L=38,400$ chips, the number of slots constituting one frame is $M=15$, and a length of one slot is $N=2,560$ chips. Here, the one-frame length L is equal to a one-frame period, and the one-slot length N is equal to a one-slot period. The resolution of a searcher represents the accuracy of search, and is used to search a correct synchronization point. Therefore, the least unit is a chip, and in order to detect a more correct synchronization point, several hypotheses (sampling points) are checked per chip to take an optimal point.

Figure 1:
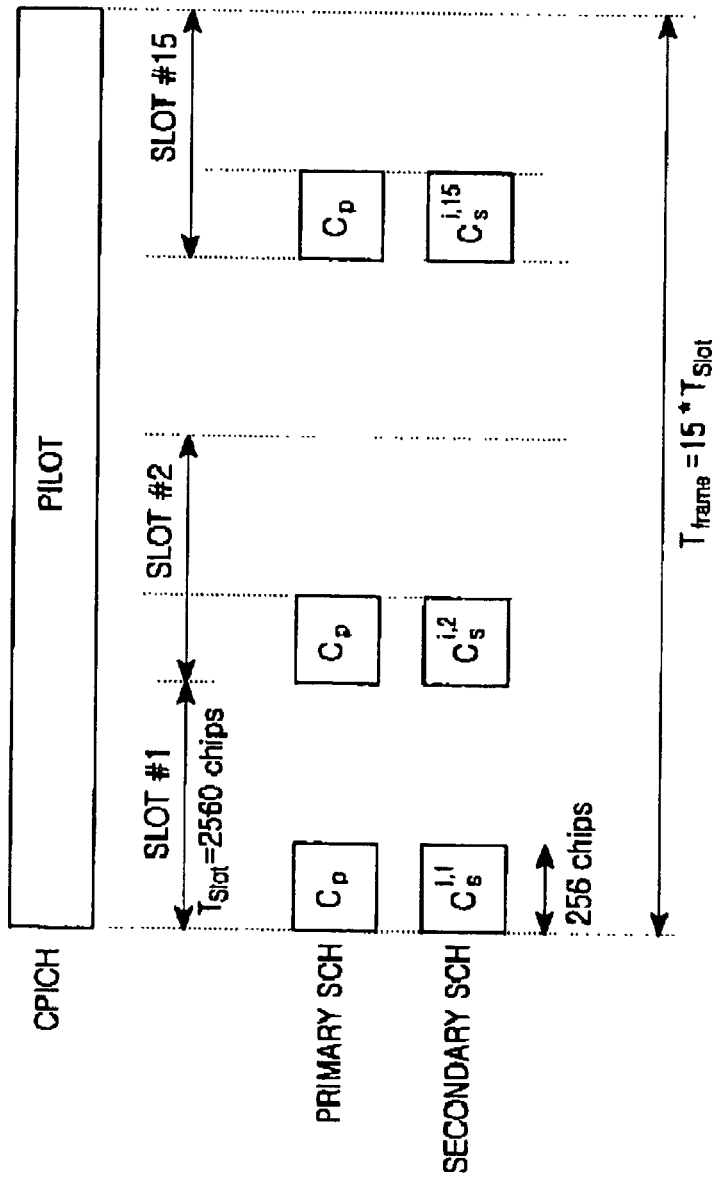
FIG. 1 illustrates a structure of an SCH and a CPICH used for a cell search in a general W-CDMA mobile communication system.
Figure 2:
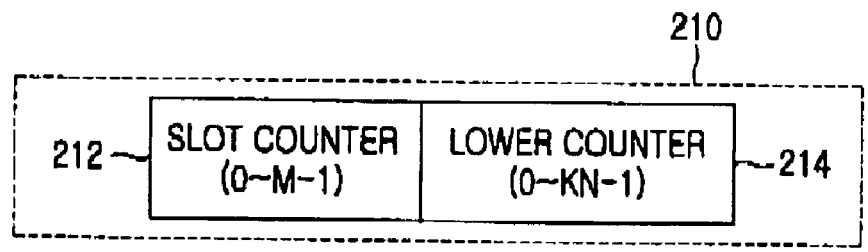
FIGS. 2 and 3 illustrate different examples of index counters according to embodiments of the present invention.
Figure 3:
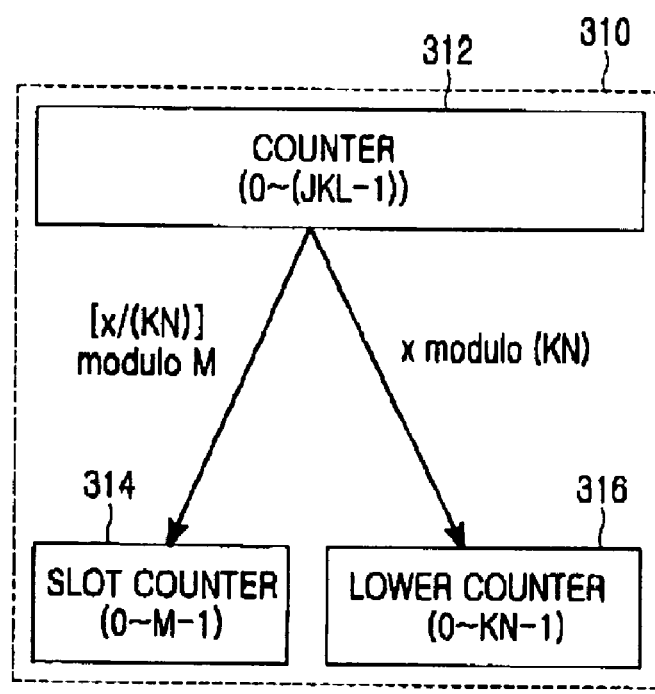

FIGS. 2 and 3 illustrate different examples of index counters according to embodiments of the present invention.

Referring to FIG. 2, an index counter 210 is comprised of a first counter 212 for counting slots constituting one frame and a second counter 214 for counting the number, $K \times N - 1$, of chips corresponding to a length of a predetermined number of slots. A count value by the first counter 212 ranges from 0 to $M-1$, and a count value by the second counter 214 ranges from 0 to $K \times N - 1$. Herein, the first counter will be referred to as "slot counter," and the second counter as "lower counter." As stated above, in the W-CDMA mobile communication system, one frame is comprised of 15 slots, so the M becomes 15. Further, in the W-CDMA mobile communication system, one slot is comprised of 2,560 chips, so the N becomes 2,560.

The lower counter 214 is reset to 0, when the count value becomes $K \times N$. The slot counter 212 increases its count value by 1, each time the lower counter 214 counts a multiple ($K \times N$) of N, i.e., counts the number N of chips constituting one slot. The slot counter 212 is reset to 0, when the number of slots constituting one frame is counted, i.e., the count value becomes M.

Referring to FIG. 3, an index counter 310 has a structure of deriving a slot count value 314 and a lower count value 316 described in conjunction with FIG. 2, using a single counter. A counter 312 constituting the index counter 310 counts from 0 to $J \times L \times K - 1$. Here, J denotes an integer ($J=1,2,3,\ldots$). The slot count value 314 and the lower count value 316 are derived from a value counted by the index counter 310 in accordance with Equation (1).

Slot count value=$\lfloor$(count value)/(K×N)$\rfloor$modulo M

Lower count value=(count value)modulo (K×N)  Equation (1)

In Equation (1), $\lfloor x \rfloor$ represents a maximum integer smaller than a given value "x," and "a modulo b" represents a remainder obtained by dividing "a" by "b."

Since the index counters 210 and 310 of FIGS. 2 and 3 operate at periods of a frame length, frame boundary points of all asynchronous cells are mapped to either specific count values of the slot counter 212 and the lower counter 214 in the index counter 210, or specific count values of the slot counter 314 and the lower counter 316 in the index counter 310. When the frame boundary point of the index counter 210 or 310 is defined as a reference point, a position of a frame boundary point of each asynchronous cell is called a "frame timing index" of the corresponding cell. Therefore, if a frame timing index of each cell is given, it is possible to calculate an offset between the cells. Here, the term "offset" means a difference between frame boundary points of the asynchronous cells.

In addition, it is possible to count a slot length with the lower counter 214 or 316 of the index counters 210 and 310. Therefore, slot boundary points of all asynchronous cells can be mapped to a specific count value of the lower counter 214 or 316 in the index counters 210 and 310. When a slot boundary point of the lower counter 214 or 316 is defined as a reference point, a position of a slot boundary point of each asynchronous cell is called a "slot timing index" of the corresponding cell. Therefore, if a slot timing index of each cell is given, it is possible to calculate an offset between slot boundary points of the cells.

Figure 4:
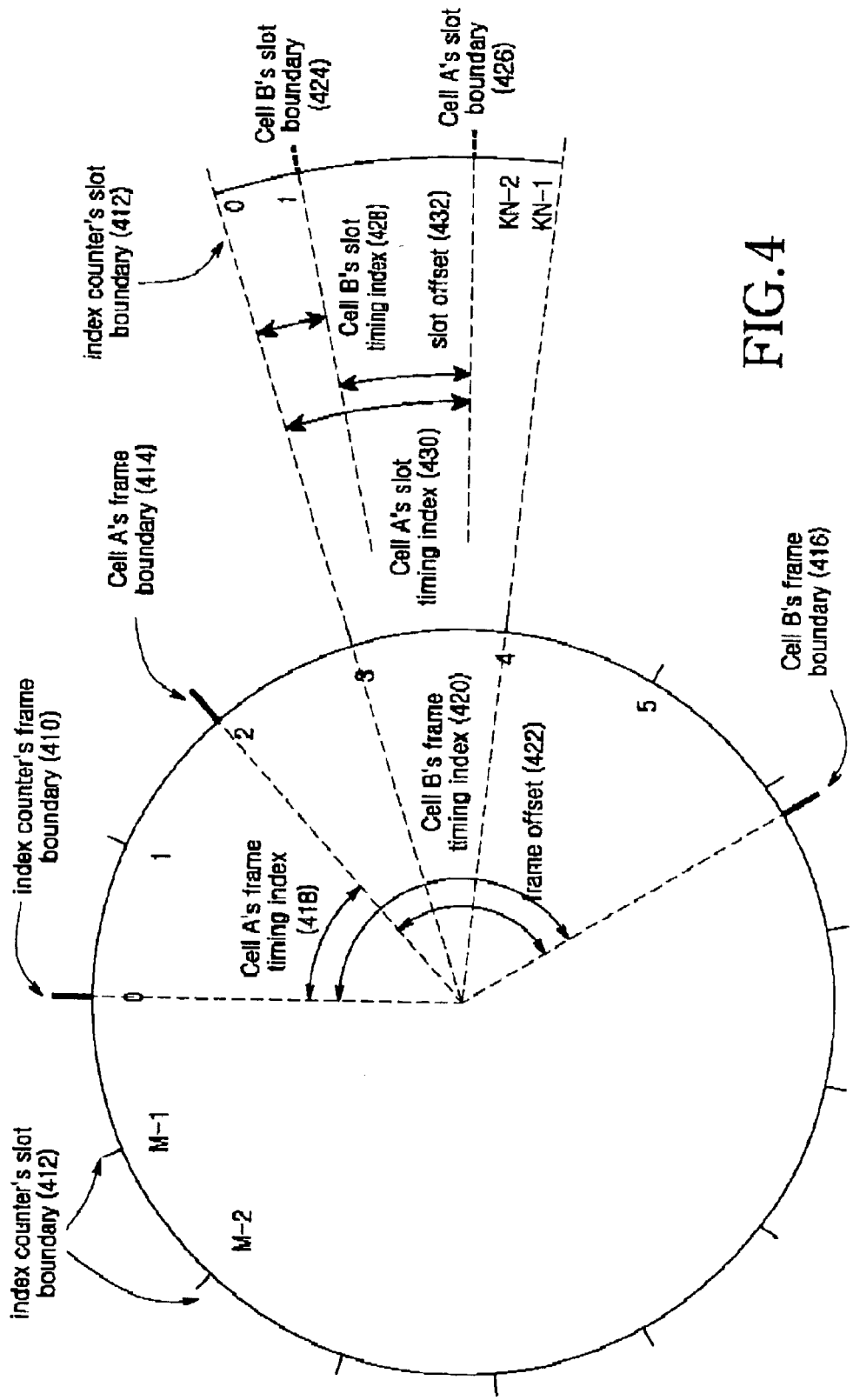
FIG. 4 illustrates a timing relationship between an index counter and asynchronous cells according to an embodiment of the present invention.

FIG. 4 illustrates a timing relationship between an index counter and asynchronous cells according to an embodiment of the present invention. Specifically, FIG. 4 illustrates a timing relationship between two asynchronous cells, Cell_A and Cell_B, by way of example.

Referring to FIG. 4, an index counter's frame boundary 410, a reference point for determining a frame boundary of cells, may correspond to a count start point of the index counters 210 and 310. The slot counter 212 or 314 of the index counters 210 and 310 counts index counter's slot boundaries 412 up to M−1 after being reset to 0 at the index counter's frame boundary 410. The index counter's slot boundary 412, a reference point for determining slot boundaries in one frame, may correspond to a count start point of the lower counter 214 or 316 of the index counters 210 and 310. The lower counter 214 or 316 restarts counting, after being reset to 0 at the index counter's slot boundary 412.

Cell A's slot boundary 426 is a point where the first cell search step is completed after the first cell search step is performed at a given time point T1=0. "T1=0" means that a count value of the lower counter 214 or 316 is 0. In this case, the first cell search step is performed at any one of the index counter's slot boundaries 412. If Cell A's slot boundary 426 is determined, Cell A's slot timing index 430 is determined by an offset between Cell A's slot boundary 426 and the give time T1=0. For example, Cell A's slot timing index 430 is determined by a count value of the lower counter 214 or 316 at Cell A's slot boundary 426.

Meanwhile, Cell B's slot boundary 424 and Cell B's slot timing index 428 are determined in the same process as used for Cell A's slot boundary 426 and Cell A's slot timing index 430.

Cell A's slot boundary 426 and Cell B's slot boundary 424 correspond to one of count values 0 to KN−1, counted by the lower counter 214 or 316. An offset between Cell A's slot boundary 426 and Cell B's slot boundary 424 is defined as a slot offset 432.

Cell A's frame boundary 414 is determined by the number of cyclic shifts of a codeword for a code group having maximum correlation energy by performing the second cell search step at Cell A's timing index 430. That is, a point spaced apart from the start point (or Cell A's slot timing index 430) of the second cell search step by a length of as many slots as the number x of cyclic shifts becomes Cell A's frame boundary 414. Cell A's frame timing index 418 is defined as a value counted by the slot counter 212 and the lower counter 214, or the slot counter 314 and the lower counter 316 at Cell A's frame boundary 414.

Meanwhile, Cell B's frame boundary 416 and Cell B's frame timing index 420 are determined in the same process as used for Cell A's frame boundary 414 and Cell A's frame timing index 418.

Cell A's frame boundary 414 and Cell B's frame boundary 416 are determined by one of count values 0 to M−1, counted by the slot counter 212 or 314, and Cell A's slot boundary 426 or Cell B's slot boundary 424. An offset between Cell A's frame boundary 414 and Cell B's frame boundary 416 is defined as a frame offset 422.

Figure 5:
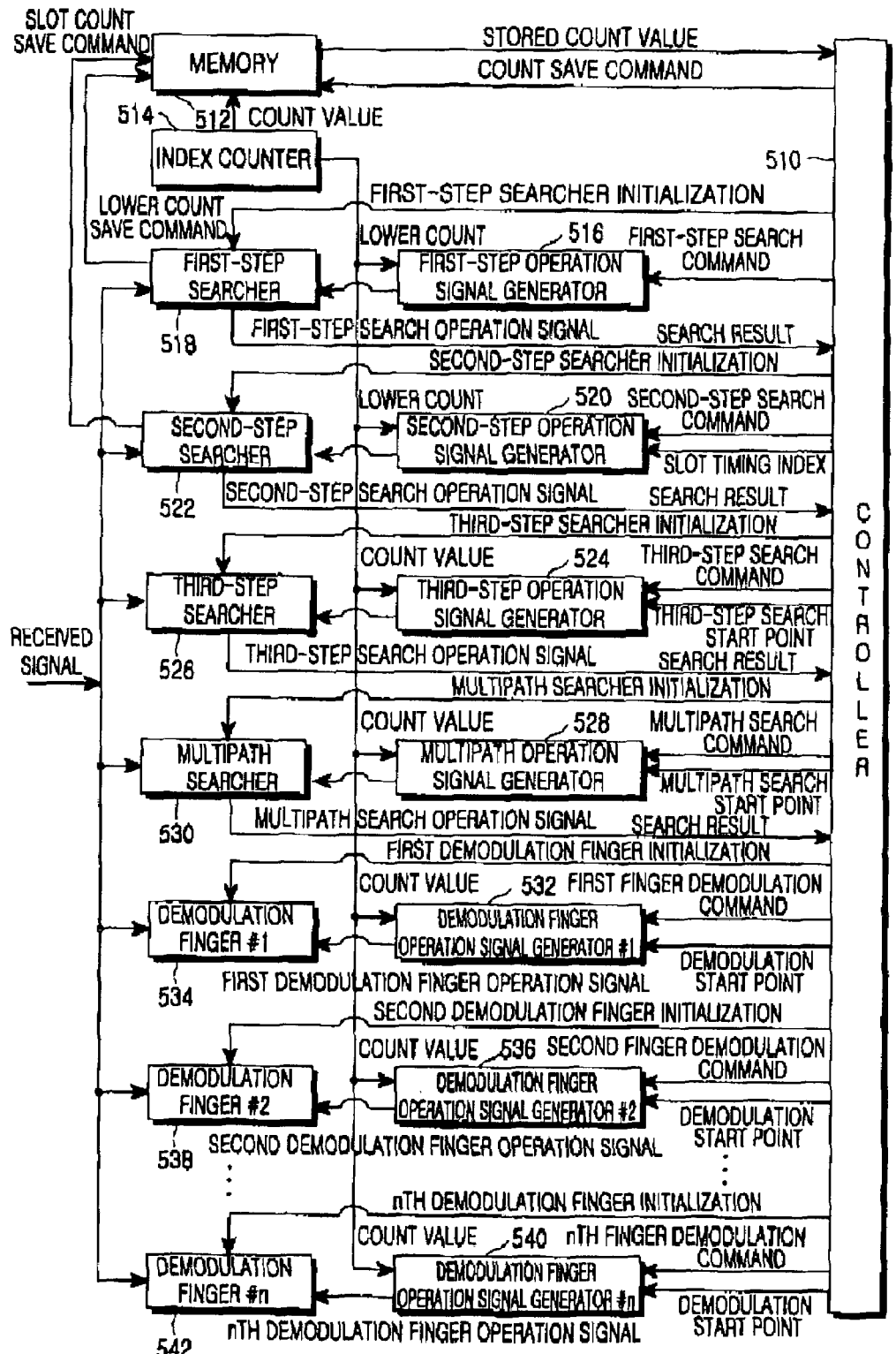
FIG. 5 illustrates a cell search apparatus in a UE for a W-CDMA mobile communication system according to an embodiment of the present invention.

FIG. 5 illustrates a cell search apparatus in a UE for a W-CDMA mobile communication system according to an embodiment of the present invention. Referring to FIG. 5, a controller 510 controls a multistep cell search operation according to the present invention. An index counter 514, having the structure illustrated in FIGS. 2 and 3, performs a counting operation stated above. A memory 512 stores a value counted by the index counter 514 in response to a save command from the exterior. The save command is divided into a lower count save command from a first-step searcher 518, a slot count save command from a second-step searcher 522, and a count save command from the controller 510. The memory 512 provides the controller 510 with the stored count value in response to the count save command from the exterior.

A first-step operation signal generator 516 generates a first-step search operation signal based on a count value provided from the index counter 514 in response to a first-step search command received from the controller 510. A detailed method of generating the first-step search operation signal by the first-step operation signal generator 516 in response to the first-step search command will be described later with reference to FIGS. 7 and 8. A first-step searcher 518 is initialized in response to an initialization command from the controller 510, and performs a first-step search operation on a received signal in response to the first-step search operation signal from the first-step operation signal generator 516. After completing the first-step search operation, the first-step searcher 518 provides the search result by the first-step search operation to the controller 510.

A second-step operation signal generator 520 generates a second-step search operation signal based on the count value provided from the index counter 514 in response to a second-step search command and a slot timing index by the first-step search operation, received from the controller 510. A detailed method of generating the second-step search operation signal by the second-step operation signal generator 520 will be described later with reference to FIG. 9. A second-step searcher 522 is initialized in response to an initialization command from the controller 510, and performs a second-step search operation on the received signal in response to the second-step search operation signal from the second-step operation signal generator 520. The received signal is a multipath signal, which is determined as a valid signal by the first-step search. After completing the second-step search operation, the second-step searcher 522 provides the search result by the second-step search operation to the controller 510. Meanwhile, the second-step searcher 522 commands the memory 512 to store a slot count value counted by the index counter 514, at a specific time point during the second-step search operation. For example, the second-step searcher 522 commands the memory 512 to store the slot count value counted by the index counter 514, at a point where the second-step search operation is started or at a point where the second-step search operation is completed.

A third-step operation signal generator 524 generates a third-step search operation signal based on the count value provided from the index counter 514 in response to a third-step search command and the search result by the second-step search operation or a third-step search start point by a hypothesis for the second-step search result, received from the controller 510. A detailed method of generating the third-step search operation signal by the third-step operation signal generator 524 will be described later with reference to FIG. 10. A third-step searcher 526 is initialized in response to an initialization command from the controller 510, and performs a third-step search operation on the received signal in response to the third-step search operation signal from the third-step operation signal generator 524. The received signal is a multipath signal, which is determined as a valid signal. After completing the third-step search operation, the third-step searcher 526 provides the search result by the third-step search operation to the controller 510. The controller 510 determines a scrambling code for a target cell to be searched based on the search result from the third-step searcher 526.

A multipath operation signal generator 528 generates a multipath search operation signal based on the count value provided from the index counter 514 in response to a multipath search command and a multipath search start point, received from the controller 510. A detailed method of generating the multipath search operation signal by the multipath operation signal generator 528 in response to the multipath search command will be described later with reference to FIG. 11. A multipath searcher 530 is initialized in response to an initialization command from the controller 510, and performs a multipath search operation on the received signal in response to the multipath search operation signal from the multipath operational signal generator 528. The received signal is a multipath signal, which is determined as a valid signal. After completing the multipath search operation, the multipath searcher 530 provides the search result by the multipath search operation to the controller 510.

A plurality of demodulation finger operation signal generators 532, 536, and 540 each generate a demodulation finger operation signal based on the count value provided from the index counter 514 in response to a finger demodulation command and a demodulation start point, received from the controller 510. The demodulation start point is a frame timing index indicating a frame boundary based on a scrambling code of a corresponding multipath signal to be demodulated. How the demodulation finger operation signal generators 532, 536, and 540 generate the demodulation finger operation signals will be described in detail later with reference to FIG. 12. A plurality of demodulation fingers 534, 538, and 542 each are initialized in response to a corresponding initialization command from the controller 510, and perform demodulation on the received signal in response to the demodulation finger operation signals from the demodulation finger operation signal generators 532, 536, and 540. The received signal is a valid multipath signal, and the scrambling operation includes an initialization operation on the scrambling code.

Figure 6:
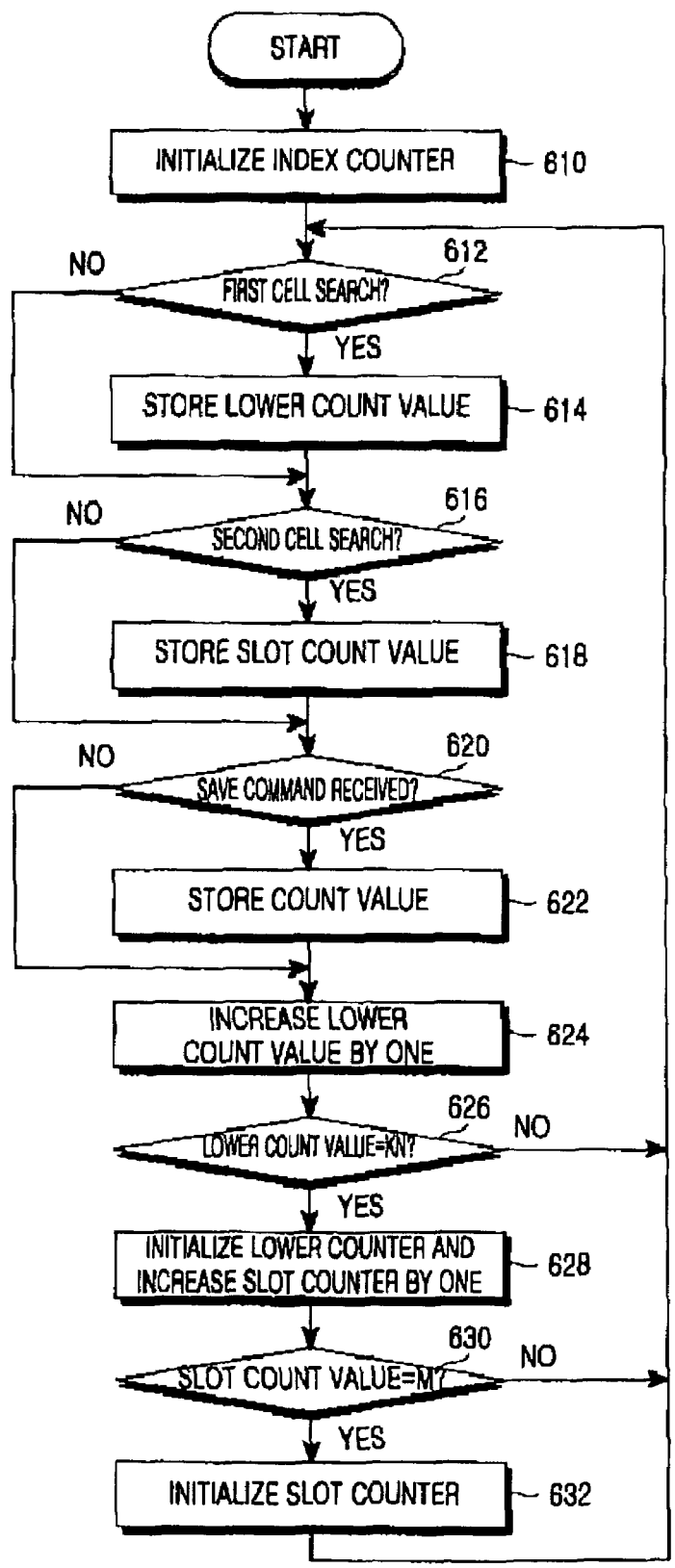
FIG. 6 illustrates a procedure for controlling an index counter for a cell search in a UE for a W-CDMA mobile communication system according to an embodiment of the present invention.

FIG. 6 illustrates a procedure for controlling an index counter for a cell search in a UE for a W-CDMA mobile communication system according to an embodiment of the present invention. Specifically, FIG. 6 illustrates a procedure for storing a count value of an index counter at a certain instant.

In FIG. 6, there are several different cases where a count value of the index counter is stored. First, a lower count value at a certain instant is stored when the first-step cell search operation is started at the instant when a save command is provided from the controller. For example, a lower count value is stored when the first-step cell search operation is started. Second, a slot count value at a certain instant is stored when the second-step cell search operation is started. For example, a slot count value is stored when the second cell search step is started. Third, a count value of the index counter is stored when a save command is generated by the controller at a certain instant in order to determine, for example, a start point of the third cell search step and a start point of the multipath search.

Referring to FIG. 6, in step 610, a UE initializes the index counter 514 and then performs a counting operation. That is, the UE resets count values of the slot counter and the lower counter constituting the index counter 514, to 0. After initializing the index counter 514, the UE determines in step 612 whether the first-step searcher 518 is performing the first-step cell search operation under the control of the controller 510. If the first-step cell search operation is being performed, the UE proceeds to step 614 where it stores a count value counted by the lower counter at a certain instant in the memory 512.

In step 614, the case where the first-step cell search is started at a constant lower count value can be excluded. If the first-step cell search is not being performed or after the operation in step 614 is completed, the UE determines in step 616 whether the second-step searcher 522 is performing the second-step cell search operation under the control of the controller 510. If the second-step cell search operation is being performed, the UE proceeds to step 618 where it stores a count value counted by the slot counter at a certain instant in the memory 512. If the second-step cell search is not being performed or after the second-step cell search operation in step 618 is completed, the UE determines in step 620 whether a save command for storing the count value counted by the index counter 514 is generated from the controller 510. As a result of the determination, if the count value save command is generated from the controller 510, the UE stores the count value counted by the index counter 514 in the memory 512. If the count value save command is not generated or after the count value is stored in step 622, the UE proceeds to step 624 where it increases a count value of the lower counter by one.

After step 624, the UE determines in step 626 whether the increased count value of the lower counter is equal to KN. That the count value of the lower counter is equal to KN means that a counting operation for one slot is completed. Therefore, if the count value of the lower counter is equal to KN, the UE proceeds to step 628 where it initializes the lower counter and increases a count value of the slot counter by one. After increasing the count value of the slot counter, the UE determines in step 630 whether the increased count value is equal to M. Since the count value of the slot counter is equal to M, this indicates that a counting operation for the slots constituting one frame is completed. Therefore, if the count value of the slot counter is equal to M, the UE proceeds to step 632 where it initializes the slot counter. However, if the lower count value is not equal to KN in step 626, or if the slot count value is not equal to M in step 630, or after the slot counter is initialized in step 632, then the UE returns to step 612 and repeatedly performs its succeeding steps.

As described above, FIG. 6 illustrates a procedure for storing a current lower count value or slot count value in response to a save command, and increasing the slot count value each time the lower count value arrives at KN.

Now, an operation of the present invention will be described in detail with reference to the accompanying drawings. Specifically, the cell search steps according to an embodiment of the present invention will be sequentially described.

First, the first cell search step performed in steps 612 and 614 of FIG. 6 has a slot-unit search period for detecting a slot boundary. In order to calculate an offset between slot timings detected at each first-step cell search, it is necessary to recognize a point T1 within a slot, where the first cell search step is started. To this end, a point where the first cell search step is started after the first-step searcher 518 is enabled by the controller 510 is distinguished by the lower count value of the index counter 512. The first cell search step according to an embodiment of the present invention will be described herein below.

Figure 7:
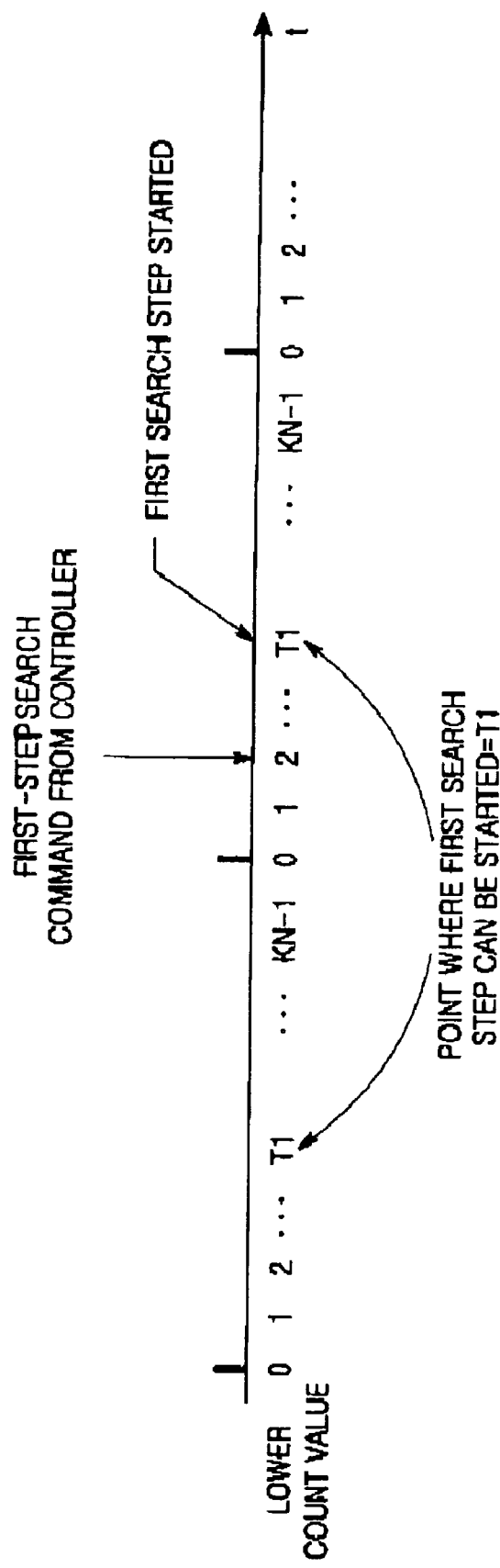
FIG. 7 illustrates a first example of a first cell search step according to an embodiment of the present invention.

FIG. 7 illustrates a first example of a first cell search step according to an embodiment of the present invention. In the first example, the first-step searcher 518 starts its operation only at a specific lower count value T1 (e.g., T1=0) of the index counter 514 after being enabled by the controller 510. Therefore, the controller 510 controls the first-step operation signal generator 516 so that the first-step searcher 518 can perform the first-step cell search operation at T1.

Referring to FIG. 7, upon receiving a cell search request, the controller 510 prepares the first-step searcher 518 for search operation through a first-step searcher initialization command, and gives a first-step search command to the first-step operation signal generator 516. Upon receiving the first-step search command from the controller 510, the first-step operation signal generator 516 receives a lower count value from the index counter 514 and monitors an instant when the lower count value is identical to T1. At the instant when the lower count value is identical to T1, the first-step operation signal generator 516 generates a first-step search operation signal. Upon receiving the first-step search operation signal from the first-step operation signal generator 516, the first-step searcher 518 performs a common first-step cell search operation, and after completion of the first-step cell search operation, reports the search result to the controller 510. The controller 510 regards, as a slot timing index, a lower count value of the index counter 514, where a valid multipath signal is located, on the basis of the search result reported from the first-step searcher 518, i.e., a search start point.

Figure 8:
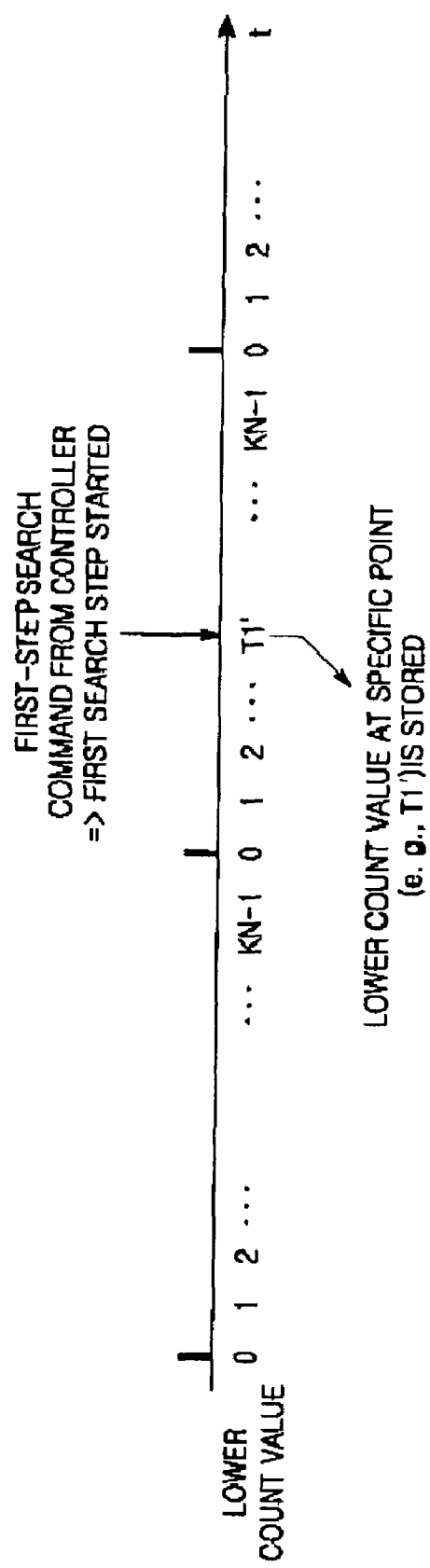
FIG. 8 illustrates a second example of a first cell search step according to an embodiment of the present invention.

FIG. 8 illustrates a second example of a first cell search step according to an embodiment of the present invention. In the second example, the first-step searcher 518 immediately performs a first-step cell search operation as it is enabled by the controller 510, and a lower count value at a specific point T1' (e.g., an instant when the first cell search step is started) is stored in the memory 512.

Referring to FIG. 8, upon receiving a cell search request, the controller 510 prepares the first-step searcher 518 for a search operation through a first-step searcher initialization command, and gives a first-step search command to the first-step operation signal generator 516. Upon receiving the first-step search command from the controller 510, the first-step operation signal generator 516 generates a first-step search operation signal. Upon receiving the first-step search operation signal from the first-step operation signal generator 516, the first-step searcher 518 performs a common first-step cell search operation, and gives a lower count save command to the memory 512. The memory 512 stores a lower count value provided from the index counter 514 in response to the lower count save command. After completion of the first-step cell search operation, the first-step searcher 518 reports the search result to the controller 510. The controller 510 regards, as a slot timing index, the lower count value of the index counter 514, where a valid multipath signal is located, on the basis of the search result reported from the first-step searcher 518, i.e., a search start point.

Next, the second cell search step performed in steps 616 and 618 of FIG. 6 detects a frame boundary and a code group depending on the searched slot timing index. To this end, a secondary synchronization channel undergoes correlation over several slots, using the slot timing index. The second cell search step according to an embodiment of the present invention will be described herein below.

Figure 9:
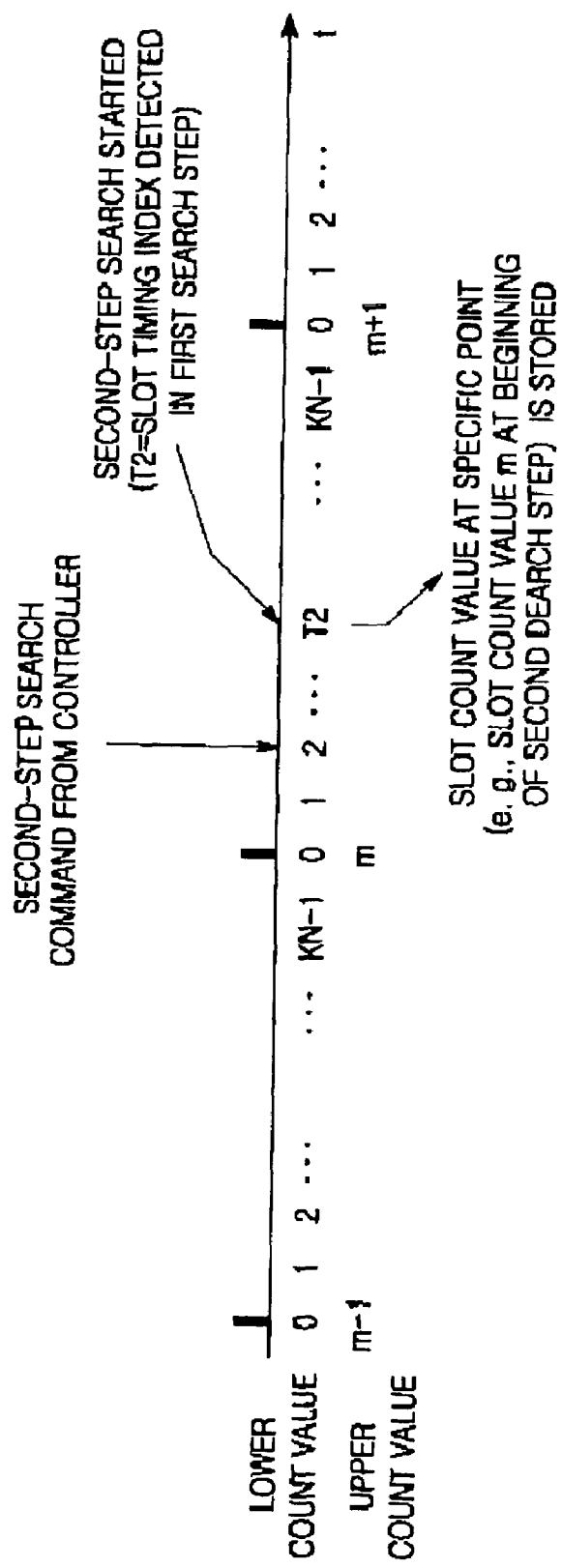
FIG. 9 illustrates an example of a second cell search step according to an embodiment of the present invention.

FIG. 9 illustrates an example of a second cell search step according to an embodiment of the present invention. Referring to FIG. 9, if the first-step cell search operation is completed, the controller 510 prepares the second-step searcher 522 for a search operation through a second-step searcher initialization command, and gives a second-step search command to the second-step operation signal generator 520. At the same time, the controller 510 provides a slot timing index T2 obtained by the first-step cell search operation to the second-step operation signal generator 520 along with the second-step search command. Upon receiving the second-step search command and the T2 from the controller 510, the second-step operation signal generator 520 receives a lower count value from the index counter 514 and monitors an instant when the lower count value is identical to the T2. When the lower count value is identical to the T2, the second-step operation signal generator 520 generates a second-step search operation signal. That is, the second cell search step will start at the slot boundary detected in the first cell search step.

Upon receiving the second-step search operation signal from the second-step operation signal generator 520, the second-step searcher 522 performs a common second-step cell search operation. After completing a correlation operation on a secondary synchronization channel over several slots by the second-step cell search operation, the second-step searcher 522 can determine a frame boundary and a code group by performing codeword decoding. Since the frame boundary is determined by the number of cyclic shifts of a codeword for a code group having the maximum correlation energy through the correlation, its start point must be recognized. That is, a point spaced apart from the start point of the second cell search step by a length of as many slots as the number of cyclic shifts becomes a frame boundary. In order to calculate a frame boundary by the second-step cell search operation, the present invention stores a slot count value at a specific instant (e.g., a point where the second-step cell search operation is started or completed) in the memory 512. In order to store the slot count value, the second-step searcher 522 gives a slot count save command to the memory 512. Upon receiving the slot count save command, the memory 512 stores a slot count value provided from the index counter 514. After completing the second-step cell search operation, the second-step searcher 522 reports the search result to the controller 510.

When the above-stated processes are completed, the controller 510 can detect a frame boundary and a code group. A slot count value at the frame boundary is determined from the result of the second cell search step, and a lower count value at the frame boundary matches the slot timing index detected by the first cell search step. Therefore, the controller 510 stores a frame timing index $T_{fr}$ corresponding to the frame boundary as an index count value. The frame timing index $T_{fr}$ is defined as $$T_{fr}=(\text{slot count value}) \times KN + (\text{slot timing index}) \quad \text{Equation (2)}$$

That is, as illustrated in Equation (2), the frame timing index $T_{fr}$ is not necessarily required to be stored with a slot count value and a lower count value, and can be determined with only a value indicating a position in a frame.

Next, an operation of the third cell search step according to an embodiment of the present invention will be described in detail herein below.

Figure 10:
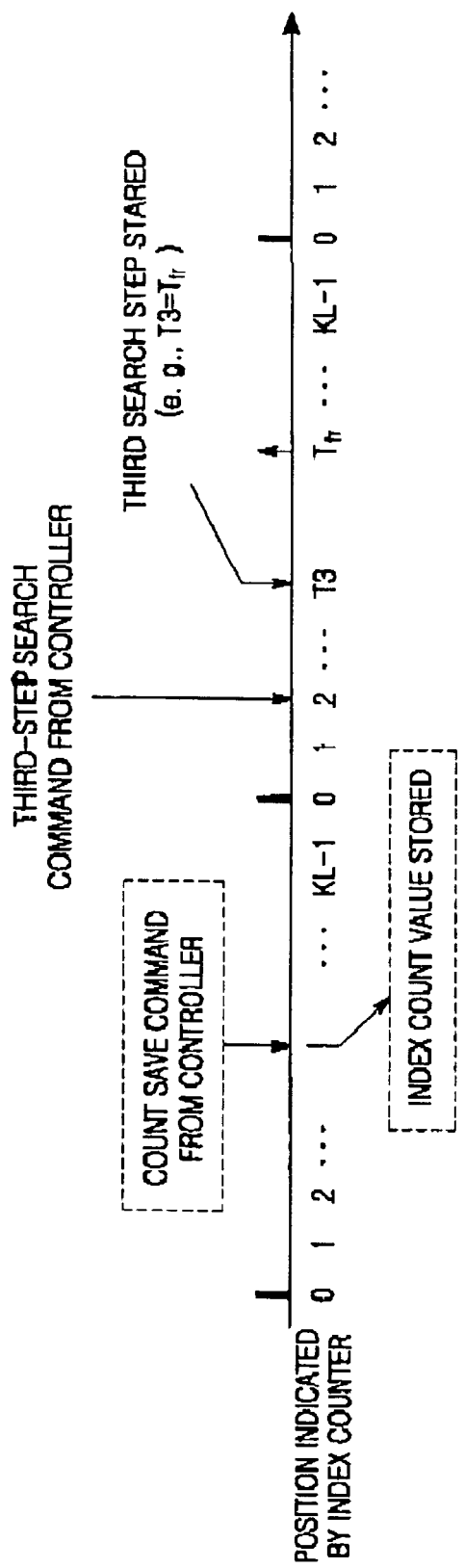
FIG. 10 illustrates an example of a third cell search step using an index counter according to an embodiment of the present invention.

FIG. 10 illustrates an example of a third cell search step using an index counter according to an embodiment of the present invention. In FIG. 10, blocks represented by a dotted line indicate a process of storing an index count value, and this process is optional. Therefore, this process will be excluded when the third cell search step is always started at the frame timing index.

Referring to FIG. 10, if the second-step cell search operation is completed or the second-step search result is provided, the controller 510 prepares the third-step searcher 526 for search operation through a third-step searcher initialization command with a scrambling code initialization command, and informs the third-step operation signal generator 524 of a point where a third-step cell search operation by a frame timing index T3 obtained in the second cell search step is to be started. Upon receiving the frame timing index T3 from the controller 510, the third-step operation signal generator 524 monitors an instant when a position designated by the index counter 514 matches the T3. When the position designated by the index counter 514 matches the T3, the third-step operation signal generator 524 generates a third-step search operation signal. Upon receiving the third-step search operation signal from the third-step operation signal generator 524, the third-step searcher 526 performs a common third-step cell search operation. After completing the third-step cell search operation, the third-step searcher 526 reports the search result to the controller 510. The controller 510 detects a scrambling code for a target cell to be searched, from the search result.

Meanwhile, in order to increase cell search speed, the third cell search step may be started at a certain point rather than at the frame boundary (or frame timing index). In this case, it is necessary to calculate an offset, $T_{fr}-T3$, between a frame timing index and a start point of the third cell search step, and initialize a scrambling code generator so that a scrambling code may have as much code phase as the offset. To this end, the present invention realizes another example of the third cell search step, as follows.

In preparation for such a case, the present invention is designed to read a count value of the index counter 514 at a specific time point. That is, when it is necessary to previously read a count value of the index counter 514, a count value of the index counter 514 at that time is stored in the memory 512 in response to a save command from the controller 510 and the stored count value is report to the controller 510. The controller 510 determines a start point of the third cell search step based on the count value of the index counter 514 and initializes a scrambling code's phase at the start point so that it is identical to an offset between a frame timing index and a start point of the third cell search step. The controller 510 starts the third cell search step when the count value of the index counter 514 matches the determined start point.

Next, a multipath search operation according to an embodiment of the present invention will be described in detail.

Figure 11:
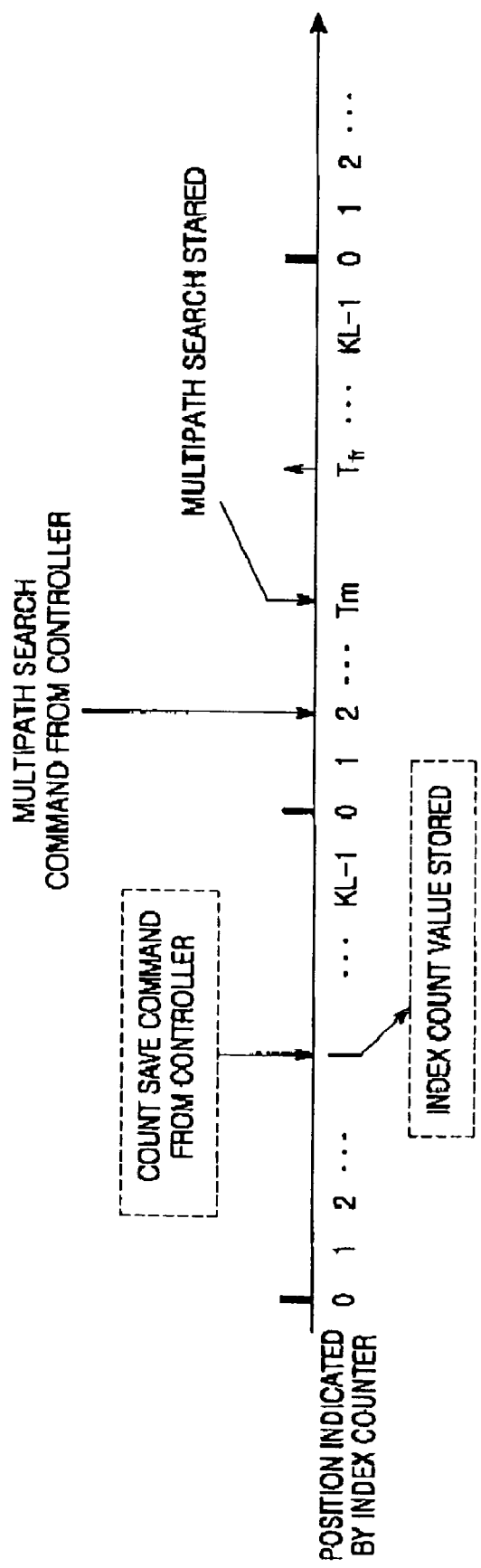
FIG. 11 illustrates an example of a multipath search using an index counter according to an embodiment of the present invention.

FIG. 11 illustrates an example of multipath search using an index counter according to an embodiment of the present invention. In FIG. 11, blocks represented by a dotted line indicate a process of storing an index count value, and this process is optional. This process can be excluded when the multipath search is always started at a point spaced apart from the frame timing index by a specific length.

Referring to FIG. 11, the multipath search is a process of periodically checking a phase of a scrambling code for a neighboring Node B to which a UE will likely be handed off, and continuously updating its frame timing index. To this end, if the cell search operation is completed, the controller 510 prepares the multipath searcher 530 for search operation through a multipath searcher initialization command. The multipath searcher initialization command includes a scrambling code initialization command. Upon receiving the multipath searcher initialization command from the controller 510, the multipath searcher 530 performs initialization for multipath search, including the scrambling code initialization. That is, the multipath searcher 530 prepares for multipath search. Further, the controller 510 previously determines a start point of the multipath search for a Node B that will perform the multipath search, and informs the multipath operation signal generator 528 of the determined start point. The multipath operation signal generator 528 generates a multipath search operation signal so that the multipath searcher 530 can start the multipath search when a position indicated by the index counter 514 is identical to the Tm determined by the controller 510. Upon receiving the multipath search operation signal, the multipath searcher 530 starts a multipath search operation on a received signal. After completing the multipath search operation, the multipath searcher 530 reports the search result by the multipath search to the controller 510.

Meanwhile, like the third cell search step, the multipath search can also initialize the scrambling code generator to a desirable code phase at a certain instant, in order to increase the search speed. In this case, the controller 510, as mentioned in the third cell search step, gives a save command to the memory 512 to store a current count value of the index counter 514. Upon receiving the save command, the memory 512 stores a current count value by accessing the index counter 512. Further, the memory 512 provides the controller 510 with the count value stored in response to the save command so that the controller 510 can determine a point where the multipath searcher 530 will start operation. After determining the operation point, the controller 510 initializes a phase of the scrambling code so that it has an offset between a frame boundary and a desired operation point. Thereafter, the controller 510 enables the scrambling code generator and starts the multipath search when the determined operation point matches the count value of the index counter 514.

By the first to third cell search steps or the multipath search, the controller 510 continuously maintains a specific scrambling code and its frame timing index, and performs demodulation on valid multipath signals by assigning a demodulation finger.

Finally, an operation of assigning a demodulation finger and performing demodulation according to an embodiment of the present invention will be described in detail herein below.

Figure 12:
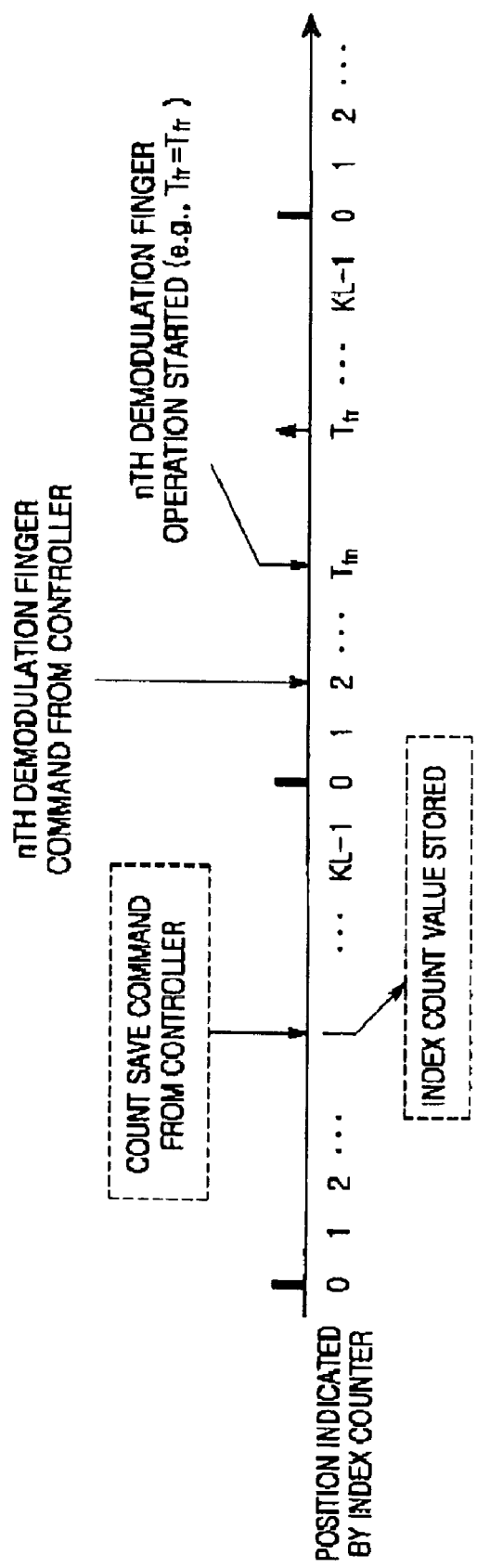
FIG. 12 illustrates an exemplary method of assigning a demodulation finger using an index counter according to an embodiment of the present invention.

FIG. 12 illustrates an exemplary method of assigning a demodulation finger using an index counter according to an embodiment of the present invention. In FIG. 12, blocks represented by a dotted line indicate a process of storing an index count value, and this process is optional. This process can be excluded when an operation start point of the demodulation finger is always identical to the frame timing index.

Referring to FIG. 12, for demodulation on received valid multipath signals, phases of scrambling codes for the demodulation fingers 534, 538, and 542 should be identical to a phase of a scrambling code of a received multipath signal. To this end, the controller 510 prepares the demodulation fingers 534, 538, and 542 for demodulation operation by generating corresponding demodulation finger initialization commands. Here, the demodulation finger initialization command includes a scrambling code initialization command. Further, the controller 510 informs the demodulation finger operation signal generators 532, 536, and 540 of a frame timing index $T_{fn}$ indicating a frame boundary of a scrambling code in a corresponding multipath signal. The demodulation finger operation signal generators 532, 536, and 540 continuously monitor a count value of the index counter 514, and generate demodulation finger operation signals to the demodulation fingers 534, 538, and 542, respectively, at an instant when a count value of the index counter 514 is coincident with the $T_{fn}$. The demodulation fingers 534, 538, and 542 start demodulation in response to the demodulation finger operation signals from the demodulation finger operation signal generators 532, 536, and 540. The demodulation fingers 534, 538, and 542 perform demodulation using a scrambling code of a received signal to be demodulated among the multipath signals.

Meanwhile, in order to increase the quality of a received signal, it is preferable to start demodulation on the multipath signal as quickly as possible. To this end, it is also possible to start demodulation by initialization the scrambling code generator so that a code phase matches an offset between frame boundaries at a certain instant, instead of unnecessarily awaiting a frame boundary as in the third cell search step or the multipath search. In this case, as described in the third cell search step and the multipath search, the controller 510 gives a save command to the memory 512 to store a current count value of the index counter 514. Upon receiving the save command, the memory 512 stores a count value by accessing the index counter 512. Further, the memory 512 provides the controller 510 with the count value stored in response to the save command so that the controller 510 can determine a point where the demodulation fingers 534, 538, and 542 will start operation. After determining the operation point, the controller 510 initializes a phase of the scrambling code so that it has an offset between a frame boundary and a desired operation point. Thereafter, the demodulation finger operation signal generators 532, 536, and 540 generate demodulation finger operation signals when the determined operation point matches the count value of the index counter 514. The demodulation fingers 534, 538, and 542 start demodulation operations by enabling their scrambling code generators included therein in response to the demodulation finger operation signals.

In sum, the embodiment of the present invention calculates a code phase offset between neighboring Node Bs, i.e., an offset between frame boundaries. In addition, the embodiment provides reference timing where the first cell search step will be started, reference timing where the second cell search step will be started, and reference timing for detecting a frame boundary. In the third cell search step, the embodiment provides a point where the scrambling code generator will be initialized, and a reference point where the third cell search step will be started, and further provide a point where the scrambling code generator for multipath search will be initialized, and a reference point where the multipath search will be started. Finally, the present invention provides a reference point where scrambling code generator of the demodulator will be initialized.

As described above, the W-CDMA mobile communication system according to the present invention orthogonally interlocks the multistep cell search and easily manages an inter-cell frame offset. In addition, it is possible to perform multipath search more efficiently.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing a cell search by receiving from a Node B a primary synchronization channel signal transmitted with as many chips as a predetermined chip length at a beginning of each slot, a secondary synchronization channel signal overlapping with the primary synchronization channel signal, being transmitted while maintaining orthogonality with the primary synchronization channel, and a common pilot channel signal scrambled by a unique scrambling code, a one-frame length of the common pilot channel signal being equal to one period of the scrambling code, each frame being comprised of a predetermined number M of slots each having a predetermined chip length N, in a UE (User Equipment) for a W-CDMA (Wideband Code Division Multiple Access) mobile communication system, the method comprising the steps of:

counting an index count value within a range of a one-frame length by a period shorter than or equal to the predetermined chip length, after being initialized at a predetermined time point;

starting a first cell search step using the primary synchronization channel signal at a given time point, and storing the index count value at a time point where slot synchronization is acquired, as a slot timing index;

starting a second cell search step using the secondary synchronization channel signal at a time point of the slot timing index, and storing the index count value at a time point where frame synchronization and a codeword group are acquired, as a frame timing index; and performing a third cell search step using the common pilot channel at a given time point, and detecting a scrambling code used by the Node B among scrambling codes constituting the codeword group.

2. The method of claim 1, wherein the index count value at the time point where the third cell search step is performed, is a time point which matches the frame timing index.

3. The method of claim 1, further comprising the step of calculating an offset between an index count value at a given time point where the third cell search step is performed and the frame timing index, and shifting a phase of an initial scrambling code for performing the third cell search step by the offset in order to compensate for the offset.

4. The method of claim 1, further comprising the step of, upon receiving a multipath search request for a multipath signal received from at least one neighboring Node B, continuously updating the frame timing index by performing a multipath search if the frame timing index indicating a frame boundary of a scrambling code used for the multipath signal matches the index count value.

5. The method of claim 4, further comprising the step of demodulating, if a multipath signal determined as a valid multipath signal by the multipath search exists, the valid multipath signal at a time point where the index count value matches a frame timing index indicating a frame boundary of a scrambling code used for the valid multipath signal.

6. The method of claim 1, further comprising the step of, upon receiving a multipath search request for a multipath signal received from at least one neighboring Node B, calculating an offset between a desired time point where the multipath search is to be performed and a frame timing index indicating a frame boundary of a scrambling code used for the multipath signal, shifting a phase of a scrambling code used for the multipath signal by the offset in order to compensate for the offset, performing the multipath search if the desired time point matches the index count value, and continuously updating the frame timing index.

7. The method of claim 6, further comprising the step of calculating, if a multipath signal determined as a valid multipath signal by the multipath search exists, an offset between a desired time point where the value multipath signal is to be demodulated and a frame timing index indicating a frame boundary of a scrambling code used for the valid multipath signal, shifting a phase of a scrambling code used for the valid multipath signal by the offset in order to compensate for the offset, and demodulating the valid multipath signal if the desired time point matches the index count value.

8. An apparatus for performing a cell search by receiving from a Node B a primary synchronization channel signal transmitted with as many chips as a predetermined chip length at a beginning of each slot, a secondary synchronization channel signal overlapping with the primary synchronization channel signal, being transmitted while maintaining orthogonality with the primary synchronization channel signal, and a common pilot channel signal scrambled by a unique scrambling code, a one-frame length of the common pilot channel signal being equal to a period of the scrambling code, each frame being comprised of a predetermined number M of slots each having a predetermined chip length N, in a UE (User Equipment) for a W-CDMA (Wideband Code Division Multiple Access) mobile communication system, the apparatus comprising:
  a controller for generating an initialization command and a search command for each of first to third cell search steps;
  an index counter for counting an index count value within a range of a one-frame length by a period equal to or shorter than the predetermined chip length after being initialized at a predetermined time point;
  a first searcher for starting the first cell search step using the primary synchronization channel signal at a given time point in response to the initialization command and the search command from the controller, and storing the index count value at a time point where slot synchronization is acquired, as a slot timing index;
  a second searcher for starting the second cell search step using the secondary synchronization channel signal at a time point where the slot timing index matches the index count value, in response to the initialization command and the search command from the controller, and storing the index count value at a time point where the frame synchronization and a codeword code are acquired, as a frame timing index; and
  a third searcher for performing the third cell search step using the common pilot channel signal at a given time point in response to the initialization command and the search command from the controller, and detecting a scrambling code used by the Node B among scrambling codes constituting a codeword group.

9. The apparatus of claim 8, wherein the first searcher comprises:
  a first-step operation signal generator for generating a first-step search operation signal at a given time point in response to the search command from the controller; and
  a first-step searcher, initialized in response to the initialization command from the controller, for starting the first cell search step using the primary synchronization channel signal in response to the first-step search operation signal from the first-step operation signal generator, and storing the index count value at a time point where slot synchronization is acquired, as a slot timing index.

10. The apparatus of claim 8, wherein the second searcher comprises:
  a second-step operation signal generator for generating a second-step search operation signal at a given time point where the slot timing index matches the index count value, in response to the search command from the controller; and
  a second-step searcher, initialized in response to the initialization command from the controller, for starting the second cell search step using the secondary synchronization channel signal in response to the second-step search operation signal from the second-step operation signal generator, and storing the index count value at a time point where frame synchronization and the codeword group are acquired, as a frame timing index.

11. The apparatus of claim 8, wherein the third searcher comprises:
  a third-step operation signal generator for generating a third-step search operation signal at a given time point in response to the search command from the controller; and
  a third-step searcher, initialized in response to the initialization command from the controller, for performing the third cell search step using the common pilot channel signal in response to the third-step search operation signal from the third-step operation signal generator, and detecting a scrambling code used by the Node B among scrambling codes constituting the codeword group.

12. The apparatus of claim 11, wherein the third-step operation signal generator generates the third-step search operation signal at a time point where the index count value matches the frame timing index, in response to the search command from the controller.

13. The apparatus of claim 11, wherein the third-step operation signal generator generates the third-step search operation signal at an instant when the index count value matches a search operation start point provided from the controller along with the search command.

14. The apparatus of claim 13, wherein the controller calculates an offset between the search operation start point and the frame timing index, and shifts a phase of an initial scrambling code by the offset in order to compensate for the offset.

15. The apparatus of claim 8, further comprising:
a multipath operation signal generator for, upon receiving a multipath search request for a multipath signal from at least one neighboring Node B from the controller, generating a multipath search operation signal if the index count value matches a frame timing index indicating a frame boundary of a scrambling code used for the multipath signal; and
a multipath searcher, initialized in response to the initialization command from the controller, for performing multipath search in response to the multipath search operation signal from the multipath operation signal generator, and continuously updating the frame timing index.

16. The apparatus of claim 15, further comprising:
at least one demodulation finger operation signal generator for generating, if a multipath signal determined as a valid multipath signal by the multipath search exists, a demodulation finger operation signal at a time point where the index count value matches a frame timing index indicating a frame boundary of a scrambling code used for the multipath signal; and
at least one demodulation finger, initialized in response to the initialization command from the controller, for demodulating the valid multipath signal in response to the demodulation finger operation signal from the demodulation finger operation signal generator.

17. A method for performing a cell search by receiving from a Node B a primary synchronization channel signal transmitted with as many chips as a predetermined chip length N at a beginning of each slot, a secondary synchronization channel signal overlapping with the primary synchronization channel signal, being transmitted while maintaining orthogonality with the primary synchronization channel signal, and a common pilot channel signal scrambled by a unique scrambling code, a one-frame length of the common pilot channel signal being equal to a period of the scrambling code, each frame being comprised of a predetermined number M of slots each having a predetermined chip length N, in a UE (User Equipment) for a W-CDMA (Wideband Code Division Multiple Access) mobile communication system, the method comprising the steps of:
after being initialized, upon power up of the UE, counting a slot count value within a one-frame length range between 0 and M−1 at periods of a slot, and counting a lower count value within a one-slot length range between 0 and K×N−1 at periods of a multiple K×N of the chip length N, wherein K is an integer;
acquiring cell synchronization by performing a first cell search step by using the primary synchronization channel signal, and defining the lower count value at a time point where the cell synchronization is acquired, as a slot timing index;
acquiring a code group and frame synchronization by performing a second cell search step by using the secondary synchronization channel signal at a time point where the slot timing index matches the lower count value, and defining the slot count value and the lower count value at a time point where the code group and the frame synchronization are acquired, as a frame timing index;

performing a third cell search step by using the common pilot channel signal at a time point where the frame timing index matches the slot count value and the lower count value; and
after the third cell search step, detecting a scrambling code used by the Node B based on the search result.

18. The method of claim 17, further comprising the step of, upon receiving a multipath search request for a multipath signal received from at least one neighboring Node B, continuously updating the frame timing index by performing the multipath search if the frame timing index indicating a frame boundary of a scrambling code used for the multipath signal matches the slot count value and the lower count value.

19. The method of claim 18, further comprising the step of demodulating, if a multipath signal determined as a valid multipath signal by the multipath search exists, the valid multipath signal at a time point where the slot count value and the lower count value match a frame timing index indicating a frame boundary of a scrambling code used for the valid multipath signal.

20. An apparatus for performing a cell search by receiving from a Node B a primary synchronization channel signal transmitted with as many chips as a predetermined chip length N at a beginning of each slot, a secondary synchronization channel signal overlapping with the primary synchronization channel signal, being transmitted while maintaining orthogonality with the primary synchronization channel signal, and a common pilot channel signal scrambled by a unique scrambling code, a one-frame length of the common pilot channel signal being equal to a period of the scrambling code, each frame being comprised of a predetermined number M of slots each having a predetermined chip length N, in a UE (User Equipment) for a W-CDMA (Wideband Code Division Multiple Access) mobile communication system, the apparatus comprising:
a controller for generating an initialization command and a search command for each of first to third cell search steps, and detecting a scrambling code used by the Node B based on the cell search result; p1 a slot counter, initialized upon power up of the UE, for counting a slot count value within a one-frame length range between 0 and M−1 at periods of a slot;
a lower count value, initialized upon power up of the UE, for counting a lower count value within a one-slot length range between 0 and K×N−1 at periods of a multiple K×N of the chip length N, wherein K is an integer;
a first-step operation signal generator for generating a first-step search operation signal at a given time point in response to the search command from the controller;
a first-step searcher, initialized in response to the initialization command from the controller, for acquiring slot synchronization by performing the first cell search step using the primary synchronization channel signal in response to the first-step search operation signal from the first-step operation signal generator, reporting the search result to the controller, and storing the index count value at a time point where slot synchronization is acquired, as a slot timing index;
a second-step operation signal generator for generating a second-step search operation signal at a time point where the slot timing index matches the lower count value, in response to the search command from the controller;
a second-step searcher, initialized in response to the initialization command from the controller, for acquiring frame synchronization and a codeword group by performing the second cell search step using the secondary synchronization channel signal in response to the second-step search operation signal from the second-step operation signal generator, reporting the search result to the controller, and storing the slot count value and the lower count value at a time point where the frame synchronization and the codeword group are acquired, as a frame timing index a third-step operation signal generator for generating a third-step search operation signal at a given time point where the frame timing index matches the slot count value and the lower count value, in response to the search command from the controller;

a third-step searcher, initialized in response to the initialization command from the controller, for performing the third cell search step using the common pilot channel signal in response to the third-step search operation signal from the third-step operation signal generator, detecting a scrambling code used by the Node B among scrambling codes constituting the codeword group, and reporting the search result to the controller; and a memory for storing a lower count value from the lower counter at a time point where a save command is received from the first-step searcher, as the slot timing index, and storing a slot count value from the slot counter and a lower count value from the lower counter at a time point where a save command is received from the second-step searcher, as the frame timing index.

21. The apparatus of claim 20, further comprising:

a multipath operation signal generator for, upon receiving a multipath search request for a multipath signal from at least one neighboring Node B from the controller, generating a multipath search operation signal if the slot count value and the lower count value match a frame timing index stored in the memory in association with a scrambling code used for the multipath signal; and a multipath searcher, initialized in response to the initialization command from the controller, for performing multipath search in response to the multipath search operation signal from the multipath operation signal generator, and reporting the multipath search result to the controller.

22. The apparatus of claim 21, further comprising:

at least one demodulation finger operation signal generator for generating, if a multipath signal determined as a valid multipath signal by the multipath search exists, a demodulation finger operation signal at a time point where the slot count value and the lower count value match a frame timing index stored in the memory in association with a scrambling code used for the multipath signal, upon receiving a demodulation request for the corresponding multipath signal; and at least one demodulation finger, initialized in response to the initialization command from the controller, for demodulating the valid multipath signal in response to the demodulation finger operation signal from the demodulation finger operation signal generator.

* * * * *